US012226883B2

(12) United States Patent
Tsai et al.

(10) Patent No.: US 12,226,883 B2
(45) Date of Patent: Feb. 18, 2025

(54) ELECTRICALLY-DRIVEN TOOL AND METHOD FOR AN ELECTRICALLY-DRIVEN TOOL TO DETECT BATTERY DECLINE

(71) Applicant: BASSO INDUSTRY CORP., Taichung (TW)

(72) Inventors: Cheng-En Tsai, Taichung (TW); Chong-Kun Hong, Taichung (TW)

(73) Assignee: BASSO INDUSTRY CORP., Taichung (TW)

( * ) Notice: Subject to any disclaimer, the term of this patent is extended or adjusted under 35 U.S.C. 154(b) by 34 days.

(21) Appl. No.: 18/337,689

(22) Filed: Jun. 20, 2023

(65) Prior Publication Data

US 2023/0415319 A1 Dec. 28, 2023

(30) Foreign Application Priority Data

Jun. 24, 2022 (TW) ................................. 111123717

(51) Int. Cl.

| | |
|---|---|
| ***B25C 1/06*** | (2006.01) |
| ***B21F 7/00*** | (2006.01) |
| ***B25C 1/00*** | (2006.01) |
| ***B25C 1/04*** | (2006.01) |

(52) U.S. Cl.

CPC .................. *B25C 1/06* (2013.01); *B21F 7/00* (2013.01); *B25C 1/008* (2013.01); *B25C 1/047* (2013.01)

(58) Field of Classification Search

CPC . B25C 1/06; B25C 1/008; B25C 1/047; B21F 7/00

See application file for complete search history.

(56) References Cited

U.S. PATENT DOCUMENTS 7,905,377 B2 * 3/2011 Krondorfer ............... B25C 1/06 173/90
7,934,566 B2 * 5/2011 Hlinka ...................... B25C 1/06 173/90
7,938,305 B2 * 5/2011 Simonelli ................. B25C 1/06 227/129
2006/0180631 A1 * 8/2006 Pedicini .................... B25C 1/06 227/8

(Continued)

FOREIGN PATENT DOCUMENTS

JP 2007090473 A 4/2007
JP 2022068526 A 5/2022

*Primary Examiner* — Andrew M Tecco
*Assistant Examiner* — Nicholas E Igbokwe
(74) *Attorney, Agent, or Firm* — Burris Law, PLLC

(57) ABSTRACT

A method is provided for an electrically-driven tool to detect battery decline. The electrically-driven tool includes a battery, a controller and a kinetic device. The controller prestores a dataset of energy provision time including a data piece of energy provision time that signifies a predetermined time length presumed to be required by the battery to provide a predetermined amount of electric energy. The controller induces provision of the predetermined amount of electric energy to the kinetic device to have the kinetic device perform a predetermined stroke with a predetermined load, times a stroke time period taken by the predetermined stroke, and determines whether the stroke time period is greater than the predetermined time length. The controller outputs a battery abnormality signal when the stroke time period is greater than the predetermined time length.

7 Claims, 6 Drawing Sheets

(56) References Cited

U.S. PATENT DOCUMENTS

| | | | | |
|---|---|---|---|---|
| 2008/0017689 | A1* | 1/2008 | Simonelli | B25C 1/06 227/132 |
| 2009/0236387 | A1* | 9/2009 | Simonelli | B25F 5/006 227/8 |
| 2011/0303428 | A1* | 12/2011 | Roth | B25C 1/008 173/1 |
| 2017/0129085 | A1* | 5/2017 | Miyashita | B25C 5/15 |
| 2019/0262981 | A1* | 8/2019 | Sprenger | B25F 5/02 |
| 2021/0276171 | A1 | 9/2021 | Lai et al. | |

* cited by examiner

ELECTRICALLY-DRIVEN TOOL AND METHOD FOR AN ELECTRICALLY-DRIVEN TOOL TO DETECT BATTERY DECLINE

CROSS-REFERENCE TO RELATED APPLICATION

This application claims priority to Taiwanese Invention Patent Application No. 111123717, filed on Jun. 24, 2022.

FIELD

The disclosure relates to a method for detecting battery decline, and more particularly to an electrically-driven tool and a method for an electrically-driven tool to detect battery decline.

BACKGROUND

Although rechargeable batteries can be recharged when the electric power is exhausted, prolonged use can change the internal chemical composition, which may lead to reduced ion concentration and greater internal resistance of the batteries, ultimately resulting in a decline in the ability to store and release electric energy.

In general, electrically-driven tools equipped with rechargeable batteries, such as nail guns, rebar tying machines, etc., can only determine whether the rechargeable batteries need recharging by measuring the voltage of the rechargeable batteries, but are unable to determine whether the ability of the rechargeable batteries to store electricity has declined. Therefore, the decision on when to replace the rechargeable batteries is often based on how long the tools can be used after a full charge or the users' subjective experience. However, replacing the rechargeable batteries too soon can be wasteful, while replacing them too late may result in unexpected power loss during operation.

SUMMARY

Therefore, an object of the disclosure is to provide an electrically-driven tool and a method for detecting battery decline, which can accurately determine the ability of the electrically-driven tool to store electricity.

According to the disclosure, the method is adapted for an electrically-driven tool to detect battery decline. The electrically-driven tool includes a battery to supply electric energy, a kinetic device to receive and convert the electric energy into kinetic energy, and a controller. The method is implemented by the controller and includes steps of: A) pre-storing a dataset of energy provision time that includes at least one data piece of energy provision time, one of the at least one data piece signifying a predetermined time length presumed to be required by the battery to provide a predetermined amount of electric energy; B) providing the predetermined amount of electric energy to the kinetic device to have the kinetic device perform a predetermined stroke with a predetermined load, and timing a stroke time period taken by the predetermined stroke; and C) determining whether the stroke time period is greater than the predetermined time length, and outputting a battery abnormality signal upon determining that the stroke time period is greater than the predetermined time length.

According to the disclosure, the electrically-driven tool includes an actuator device, a kinetic device and an electrically-controlled device. The actuator device is configured to output kinetic energy during a predetermined stroke. The kinetic device is configured to generate mechanical energy for the actuator device to output as the kinetic energy, and includes a motor and a movable component. The motor is configured to be activated to convert electric energy into the mechanical energy during the predetermined stroke. The movable component is disposed to perform a pre-arranged movement during the predetermined stroke. The electrically-controlled device includes a battery to supply the electric energy to the motor, a detector switch, and a controller electrically connected to the battery and the detector switch. The detector switch is configured to output a detection signal when the movable component is detected thereby. The controller is configured to perform the method of this disclosure, to start the predetermined stroke based on a trigger signal, and to end the predetermined stroke based on the detection signal.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
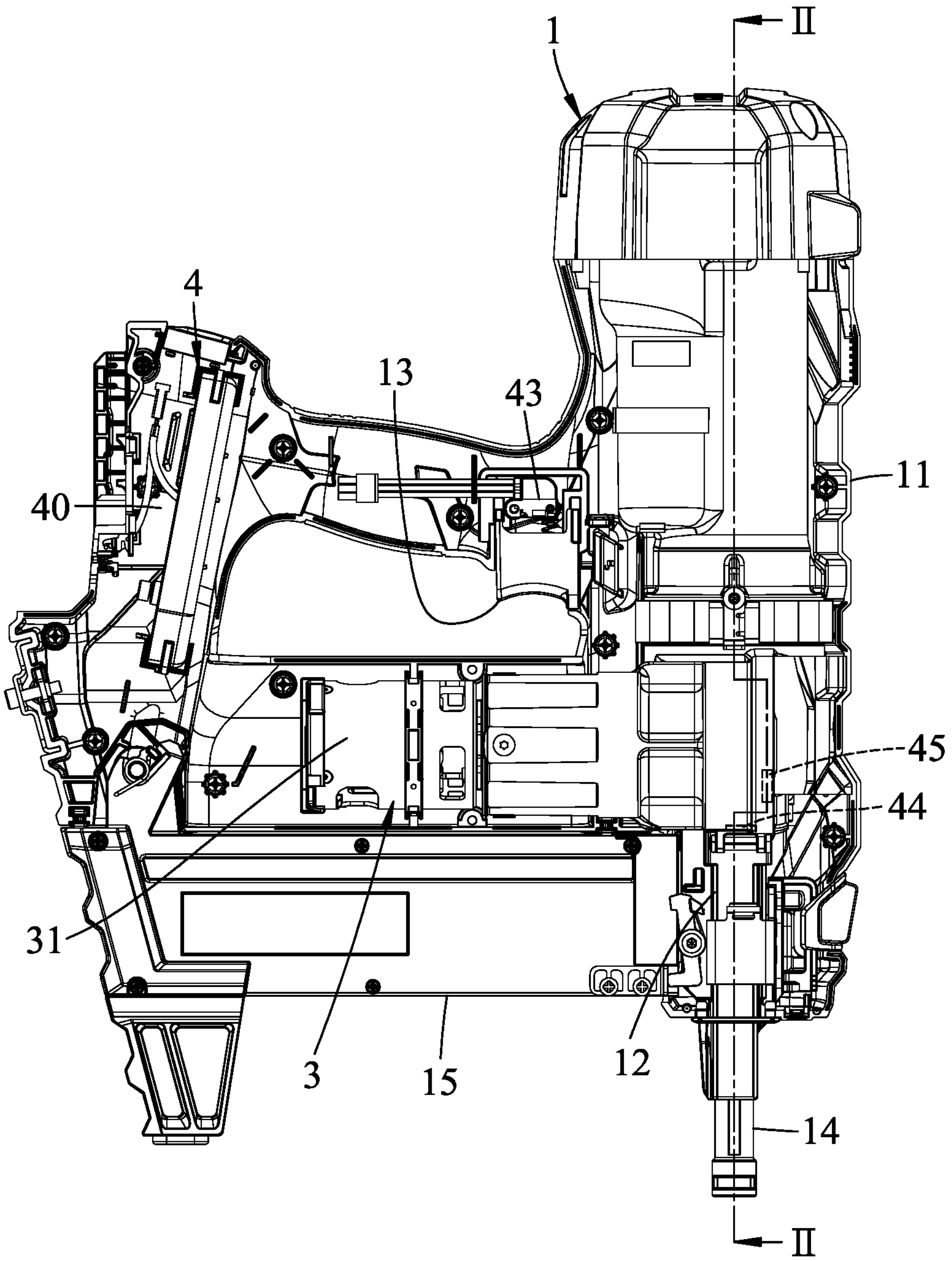
FIG. 1 is a fragmentary side view illustrating a first embodiment of an electrically-driven tool according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

It should be noted herein that for clarity of description, spatially relative terms such as "top," "bottom," "upper," "lower," "on," "above," "over," "downwardly," "upwardly" and the like may be used throughout the disclosure while making reference to the features as illustrated in the drawings. The features may be oriented differently (e.g., rotated 90 degrees or at other orientations) and the spatially relative terms used herein may be interpreted accordingly.

Figure 2:
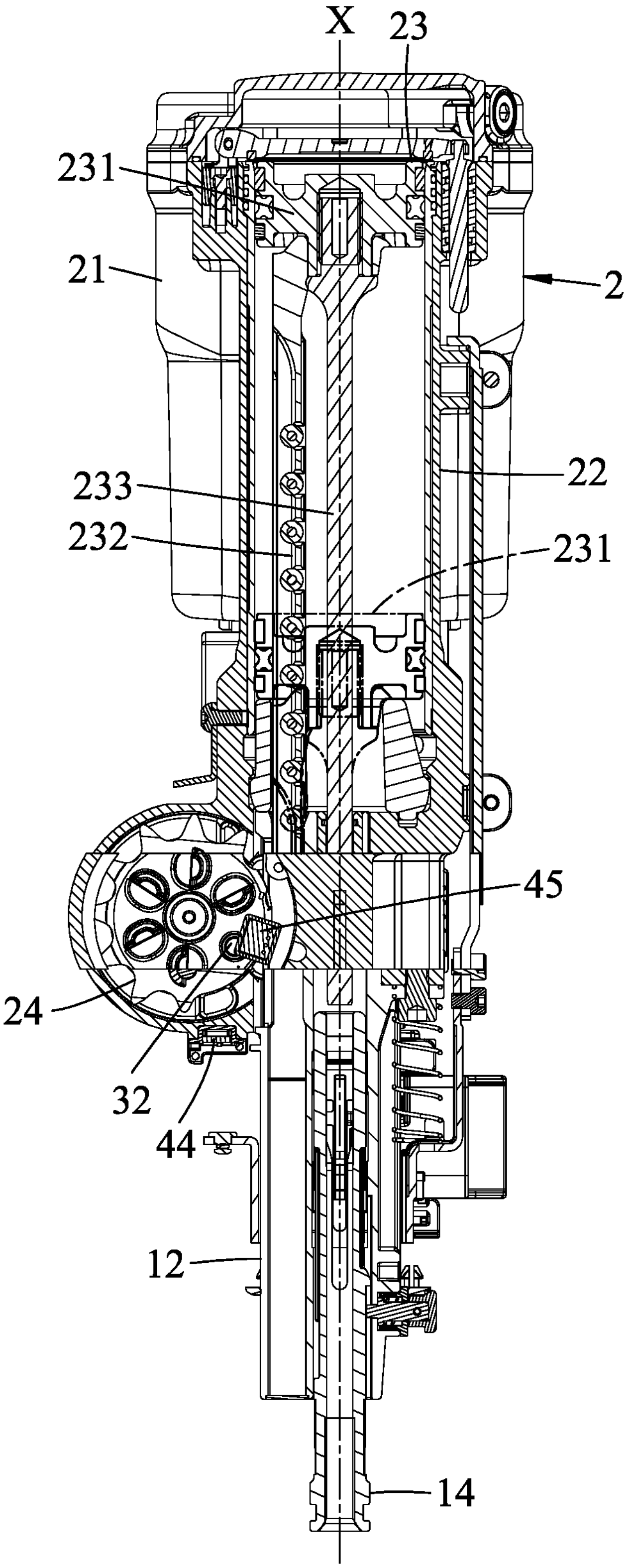
FIG. 2 is a sectional view of the first embodiment taken along line II-II in FIG. 1.
Figure 3:
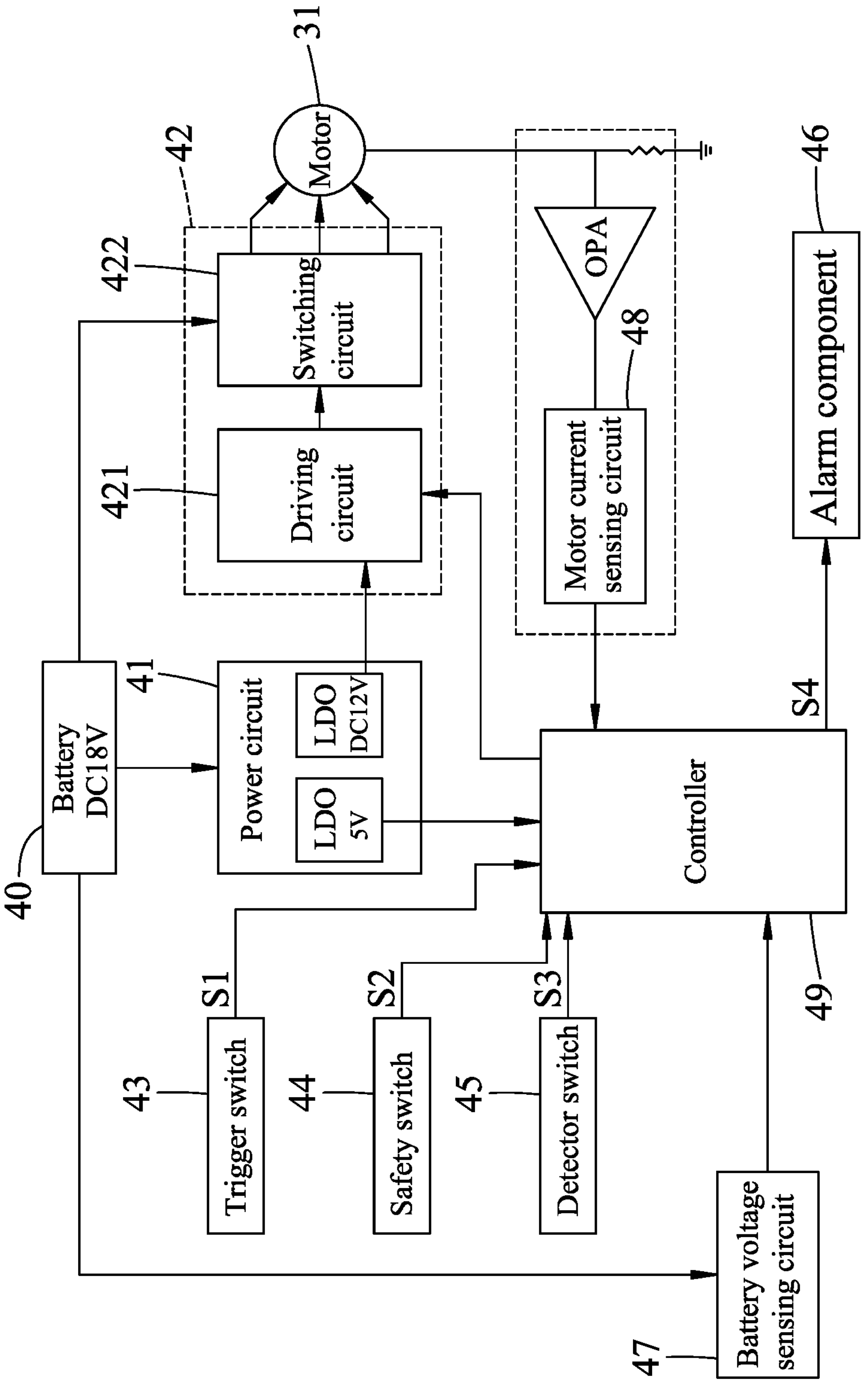
FIG. 3 is a block diagram illustrating an electrically-controlled device of the first embodiment.

Referring to FIGS. 1, 2 and 3, a first embodiment of an electrically-driven tool according to this disclosure is a pneumatic electric nail gun that includes a nail gun body device 1, an actuator device 2, a kinetic device 3 and an electrically-controlled device 4.

The nail gun body device 1 includes a nail gun body 11, a nail gun seat 12 that is mounted to the nail gun body 11 and that is adapted to load a nail (not shown), a trigger 13 that is mounted to the nail gun body 11 and that is configured to be pulled to move, a safety unit 14 that is partly disposed between the nail gun seat 12 and the actuator device 2 and that is operable to move along an X-axis direction, and a nail container 15 that is connected to the nail gun seat 12 and that is adapted to accommodate a plurality of nails (not shown). The safety unit 14 is adapted to move when a tip of the nail gun is firmly pressed against an object (not shown).

The actuator device 2 is configured to output kinetic energy during a predetermined stroke (e.g., a nailing stroke), and includes a gas storage cylinder 21 that is mounted to the nail gun body 11 and that is configured for storing gas under a predetermined air pressure (namely, pressurized gas), a striking cylinder 22 that is connected to the nail gun seat 12 and that is configured for receiving the pressurized gas from the gas storage cylinder 21, a piston assembly 23 that is movably disposed in the striking cylinder 22, and a lifting gear 24 that is rotatably mounted to the nail gun seat 12.

The piston assembly 23 includes a piston 231 that is in airtight contact with an inner surface of the striking cylinder 22, a lifting rod 232 that is connected to the piston 231 and that is detachably engaged with the lifting gear 24, and a driving pin 233 that is connected to the piston 231 and that is disposed in the nail gun seat 12. The driving pin 233 is adapted to strike a nail.

In this embodiment, the lifting gear 24 is configured to have a teeth-missing portion, so that the lifting gear 24 will detach from the lifting rod 23 in a short period of time during a revolution of the lifting gear 24. When the lifting gear 24 detaches from the lifting rod 23, the piston assembly 23 will be driven by the predetermined air pressure of the gas that enters the striking cylinder 22 to move from a preparation position (e.g., a position where the piston assembly 23 that is drawn by solid lines is located in FIG. 2) to a completion position (e.g., a position where the piston 231 that is drawn by chain lines is located in FIG. 2) along the X-axis direction. The piston 231 of the piston assembly 23 is distal from the lifting gear 24 when the piston assembly 23 is at the preparation position, and is adjacent to the lifting gear 24 when the piston assembly 23 is at the completion position.

Since the structure of the pneumatic electric nail gun and the actions of nail-striking and restoring the piston assembly 23 back to the preparation position are known in the art, the descriptions above should be sufficient to enable persons skilled in the art to derive and expand more details thereon, and thus more relevant explanations will be omitted herein for the sake of brevity.

The kinetic device 3 is mounted to the nail gun body device 1, and is configured to generate mechanical energy for the actuator device 2 to output as the kinetic energy during the predetermined stroke. The kinetic device 3 includes a motor 31 to be activated to convert electric energy into the mechanical energy during the predetermined stroke, and a movable component 32 disposed to perform a pre-arranged movement during the predetermined stroke.

The motor 31 rotates the lifting gear 24 when activated. In this embodiment, the movable component 32 may be a magnetic component. In one example, the movable component 32 is a magnet that is mounted to the lifting gear 24, so the movable component 32 can perform the pre-arranged movement with the rotation of the lifting gear 24 (e.g., performing a cycle of revolution around an axle of the lifting gear 24 with a cycle of rotation of the lifting gear 24).

The electrically-controlled device 4 is mounted to the nail gun body 11, and includes a battery 40, a power circuit 41, a driving module 42, a trigger switch 43, a safety switch 44, a detector switch 45, an alarm component 46, a battery voltage sensing circuit 47, a motor current sensing circuit 48 and a controller 49.

The battery 40 is configured to supply electric power required by the electrically-driven tool.

The power circuit 41 is electrically connected to the battery 40, the controller 49 and the driving module 42, and is configured to provide the electric power received from the battery 40 (e.g., at a direct-current (DC) voltage of 18 volts) after voltage stabilization and voltage regulation. The power circuit 41 may include, for example, two low-dropout regulators (LDOs) configured to provide two different voltages that are respectively provided to the controller 49 and the driving module 42.

The driving module 42 includes a driving circuit 421 and a switching circuit 422. The driving circuit 421 receives a pulse width modulation (PWM) signal outputted by the controller 49, and controls the switching circuit 422 to drive the motor 31 to rotate at a target rotational speed based on a duty ratio of the PWM signal. In some embodiments, the switching circuit 422 may be realized using a metal-oxide-semiconductor field-effect transistor (MOSFET).

The trigger switch 43 is disposed to be triggered by the trigger 13 when the trigger 13 is being pulled, so as to output a trigger signal S1.

The safety switch 44 is disposed to be triggered by the safety unit 14 when the safety unit 14 is being moved by pressing, so as to output a safety signal S2.

In this embodiment, the detector switch 45 is a magnetic sensor, such as a Hall sensor, and is installed at a position that corresponds to a specific location where the movable component 32 is located when the lifting gear 24 is in a standby position before starting the predetermined stroke. When the movable component 32 is located at the specific location, the detector switch 45 will sense a magnetic field created by the movable component 32, and thus generate a detection signal S3.

The alarm component 46 is mounted to the nail gun body 11, and is configured to generate an alarm message. The alarm component 46 can be a light emitting component (e.g., a light emitting diode), a buzzer, a display, other suitable components, or any combination thereof, and the alarm message may be presented in a form of light, sound, text, or any combination thereof.

The battery voltage sensing circuit 47 is connected between the battery 40 and the controller 49 for sensing a voltage of the battery 40, and for the controller 49 to adjust the duty ratio of the PWM signal that is outputted to the driving circuit 421 based on the voltage of the battery 40, thereby maintaining operation of the motor 31 at the target rotational speed.

The motor current sensing circuit 48 is configured to sense a current of the motor 31 for the controller 49 to monitor the current of the motor 31. In one example, overcurrent protection may be performed by the controller 49 controlling the driving circuit 421 to terminate operation of the motor 31 when the current of the motor 31 is excessively large.

The controller 49 is configured to receive the trigger signal S1, the safety signal S2 and the detection signal S3, to control the motor 31 based on the trigger signal S1, the safety signal S2 and the detection signal S3, and to output a battery abnormality signal S4 upon determining that the battery 40 is in an abnormal state, so as to control the alarm component 46 to generate the alarm message.

For ease of explanation hereinafter, all directions to be used is based upon the face of FIG. 2. For example, a direction pointing from the piston 231 toward the nail gun seat 12 is to be referred to as a downward direction, and a direction pointing from the piston 231 away from the nail gun seat 12 is to be referred to as an upward direction.

Normally (namely, when the pneumatic electric nail gun is not performing the predetermined stroke), the piston 231 is disposed in an upper portion of the striking cylinder 22 and distal from the nail gun seat 12, namely, the piston assembly 23 is at the preparation position, and the gas storage cylinder 21 is sealed and stores the pressurized gas therein.

When the battery 40 supplies the required electric power through the power circuit 41 and the lifting gear 24 is correctly at the standby position, the detector switch 45 would sense presence of the movable component 32 and output the detection signal S3. If a user intends to operate the pneumatic electric nail gun to strike a nail into an object (not shown), he/she may firmly press the safety unit 14 against the object to make the safety unit 14 move upwardly along the X-axis direction, so as to trigger the safety switch 44 to output the safety signal S2. While maintaining the safety unit 14 in this state, the user can pull the trigger 13, such that the trigger 13 moves to trigger the trigger switch 43 to output the trigger signal S1. Upon receipt of the trigger signal S1 under this circumstance (namely, the controller 49 receives the detection signal S3, the safety signal S2 and the trigger signal S1 all together at that moment), the controller 49 activates the motor 31 to perform the predetermined stroke of the actuator device 2. During the predetermined stroke, the motor 31 rotates the lifting gear 24 in a counterclockwise direction. When the lifting gear 24 rotates to be disengaged from the lifting rod 232 for a brief moment, the lifting rod 232 is no longer resisted by the lifting gear 24 and the piston 231 is thus driven by the air pressure of the pressurized gas to move downwardly to the completion position. The movement of the piston 231 drives the driving pin 233 to slide in the nail gun seat 12 along the X-axis direction, so as to output the kinetic energy and strike the nail.

After completion of the nail striking, the lifting gear 24 is still driven by the motor 31 to continuously rotate in the counterclockwise direction to be engaged with the lifting rod 232 again, and to make the lifting rod 232 move upwardly through the engagement, so as to push the piston 231 and the driving pin 233 back to the preparation position. The upward movement of the piston 231 pushes the gas in the striking cylinder 22 to enter the gas storage cylinder 21, and the gas is thus pressurized and stored in the gas storage cylinder 21.

Briefly speaking, during a complete cycle of rotation of the lifting gear 24, the piston assembly 23 is driven by the air pressure to move downwardly to perform nail striking, and then the motor 31 is driven by the electric power to move the piston assembly 23 upwardly to have the gas pressurized at the predetermined air pressure, so the pneumatic electric nail gun returns back to the standby state.

A method for detecting battery decline according to this disclosure is described hereinafter using the first embodiment of the electrically-driven tool as an example, and is implemented by the controller 49. The method includes three primary steps (A), (B) and (C).

In step (A), a dataset of power provision time is pre-stored in the controller 49. The dataset of energy provision time is related to a period of time required by the battery 40 to provide a predetermined amount of electric energy, and includes at least one data piece of energy provision time that signifies a predetermined time length $T_0$ presumed to be required by the battery 40 to provide the predetermined amount of electric energy. In this embodiment, the dataset of energy provision time includes a plurality of data pieces of energy provision time, each of which corresponds to a respective one of different battery specifications of a battery, wherein each battery specification relates to a specific type or connection method of multiple battery cells of the battery. The data piece of energy provision time that signifies the predetermined time length $T_0$ corresponds to the battery specification of the battery 40 of the electrically-driven tool.

In this embodiment, the controller 49 detects the battery specification of the battery 40, and acquires one of the data pieces of energy provision time that corresponds to the battery 40 based on the battery specification thus detected. The battery specification determines the discharging capability of the battery 40, and is related to the type (e.g., 18650-type, 21700-type, etc.) or connection method (e.g., 5S1P configuration, 5S2P configuration, etc., where "S" stands for series connection, and "P" stands for parallel connection) of multiple battery cells of the battery 40.

In electrically-driven tools, different types and/or different connection methods of battery cells of batteries may lead to different electric resistances, so the controller 49 may detect an electric resistance of the battery 40, and use a pre-stored lookup table that records relationships between electric resistances and battery specifications to obtain the battery specification of the battery 40. In one example, batteries of different battery specifications may be configured to include different identification resistors of different resistances, and the electrically-driven tool may be configured to include a voltage divider resistor, such that the identification resistor and the voltage divider resistor are connected in series when the battery 40 is installed in the electrically-driven tool, and the controller 49 can identify the battery specification of the battery 40 based on a division voltage resulting from the voltage divider resistor.

In step (B), the controller 49 controls the driving module 42 to provide the predetermined amount of electric energy to the kinetic device 3 to have the kinetic device 3 perform the predetermined stroke with a predetermined load, and times a stroke time period T taken by the predetermined stroke.

In this embodiment, the predetermined stroke corresponds to a pre-arranged movement of the movable component 32 (e.g., the movable component 32 revolves around an axle of the lifting gear 24 with the rotation of the lifting gear 24 in the embodiment, and the pre-arranged movement refers to a complete cycle of the revolution of the movable component 32).

In step (C), the controller 49 determines whether the stroke time period T is greater than the predetermined time length $T_0$, and outputs the battery abnormality signal S4 upon determining that the stroke time period T is greater than the predetermined time length $T_0$.

The determination is made based on an equation of $$W=P\times t=U\times I\times t \tag{1}$$

where W represents electric energy consumed by the electrically-driven tool in a single predetermined stroke, presented in a unit of joules (J); P represents power, which is related to work done in a single predetermined stroke; t represents a period of time taken by a single predetermined stroke, presented in a unit of seconds; U represents voltage provided by the battery presented in a unit of volts (V); and I represents current outputted by the battery 40, presented in a unit of amperes (A).

It can be derived from equation (1) that, when the kinetic device 3 performs the predetermined stroke with a predetermined load, since the predetermined stroke and the predetermined load are known factors that have fixed values, the electric energy consumed by the electrically-driven tool would be a fixed value that is known. Therefore, by measuring the voltage of the battery 40 (i.e., the parameter "U" in equation (1)) and the stroke time period T (i.e., the parameter "t" in equation (1)), the current outputted by the battery 40 (i.e., the parameter "I" in equation (1)) can be acquired, and the controller 49 can thus determine whether the battery 40 is able to output the current normally. When the battery 40 has declined in terms of its discharging capability (i.e., the parameter "I" becomes smaller) because of prolonged use, time required to provide the predetermined amount of electric energy (i.e., the stroke time period T) would increase. Accordingly, the controller 49 can determine whether the capacity of the battery 40 has declined to an abnormal state by determining whether the stroke time period T is greater than the predetermined time length $T_0$. For example, assuming that the battery 40 that operates normally is able output a current of 2.5 A at a low voltage of 16 V to provide the predetermined amount of electric energy in 0.4 seconds or less, the predetermined time length $T_0$ can be set as 0.4 seconds. When the stroke time period T measured by the controller 49 is greater than 0.4 seconds, the controller 49 may determine that the capacity of the battery 40 has declined to an abnormal state.

Figure 4:
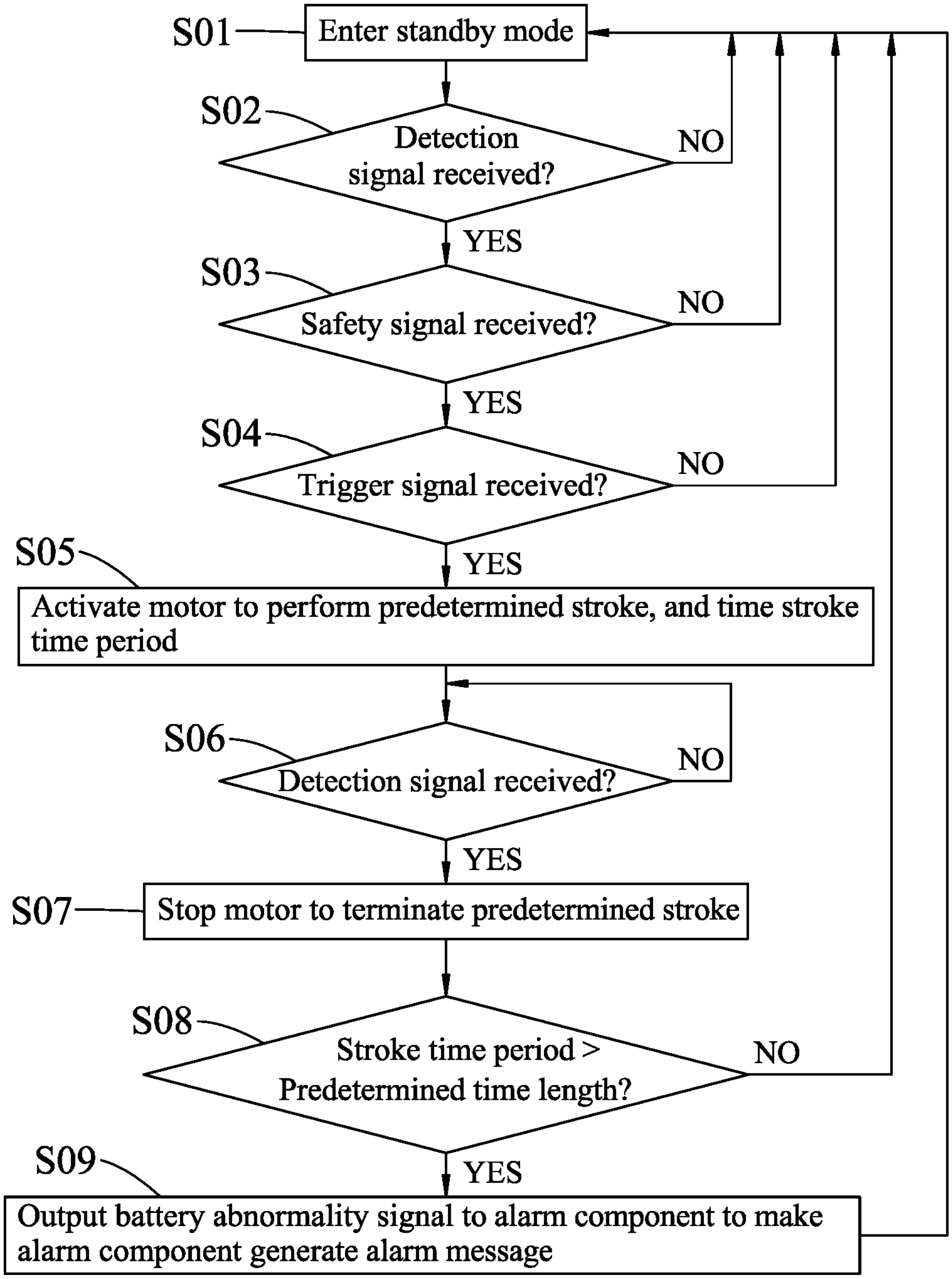
FIG. 4 is a flow chart illustrating steps of a method for an electrically-driven tool to detect battery decline according to some embodiments of this disclosure.

In detail, the method for detecting battery decline according to this disclosure may include steps S01 to S09, as shown in FIG. 4.

In step S01, the battery 40 supplies the electric power, and the electrically-driven tool enters a standby mode.

In step S02, the controller 49 determines whether the detection signal S3 is received. The flow goes to step S03 when the determination is affirmative, and goes back to step S01 when otherwise, which means that the detector switch 45 is unable to detect the movable component 32, and the lifting gear 24 may be at an abnormal position.

In step S03, the controller 49 determines whether the safety signal S2 is received. The flow goes to step S04 when the determination is affirmative, and goes back to step S01 when otherwise, which means that the safety unit 14 is not pressed against an object (not shown) to be nailed.

In step S04, the controller 49 determines whether the trigger signal S1 is received. The flow goes to step S05 when the determination is affirmative, and goes back to step S01 when otherwise, which means that the trigger 13 is not being pulled.

In step 505, the controller 49 activates the motor 31 to perform the predetermined stroke with the predetermined load, and starts to time the stroke time period T. In other words, the controller 49 starts the predetermined stroke based on the trigger signal. The predetermined load is a known load that is predetermined. In the pneumatic electric nail gun, the motor 31 rotates to compress the gas, and the load results from the air pressure of the gas, which is a fixed value. The predetermined stroke is a fixed stroke that is predetermined. In the pneumatic electric nail gun, the motor 31 rotates for a fixed angle to drive rotation of the lifting gear 24 in a complete cycle during a single predetermined stroke, thereby making the movable component 32 perform the pre-arranged movement.

In step S06, the controller 49 determines whether the detection signal S3 is received again. The flow goes to step S07 when the determination is affirmative, and the controller 49 continuously repeats step S06 and controls the motor 31 to maintain the operation when otherwise.

In step S07, the controller 49 terminates the operation of the motor 31, and the flow ends. In other words, the controller 49 ends the predetermined stroke based on the detection signal.

In other words, the stroke time period T is a period of time during which the motor 31 is activated. According to the description concerning the procedure of the nail striking, it is known that, in a single predetermined stroke, the lifting gear 24 turns exactly one full circle (which corresponds to the fixed angle the motor 31 rotates for), and the piston assembly 23 is driven by the air pressure to complete the nail striking and is driven by the force from the rotation of the lifting gear 24 to complete the compression of the gas. Therefore, an initial position of the movable component 32, which is magnetic in this embodiment, is set to correspond to the position of the detector switch 45 (i.e., the Hall sensor in this embodiment), so that when the detector switch 45 detects the movable component 32 again after the movable component 32 starts to revolve with the rotation of the lifting gear 24, the movable component 32 has turned exactly one full circle, and the controller 49 will receive the detection signal S3 again to terminate the operation of the motor 31.

In step S08, the controller 49 determines whether the stroke time period T is greater than the predetermine time length $T_0$. The flow goes to step S09 when the determination is affirmative, and goes back to step S01 when otherwise.

In step S09, the controller 49 outputs the battery abnormality signal S4 to the alarm component 46, and controls the alarm component 46 to generate the alarm message. Then, the flow goes back to step S01.

The alarm message is used to notify the user that the capability of the battery 40 in storing electric energy and discharging has seriously declined, and the battery 40 needs to be replaced.

It is noted that the electrically-driven tool according to this disclosure is not limited to the pneumatic electric nail gun as exemplified in FIGS. 1 and 2. In a second embodiment, the electrically-driven tool can be a spring-loaded electric nail gun as exemplarily illustrated in FIG. 5. The spring-loaded electric nail gun also includes a nail gun body device 1, an actuator device 2, a kinetic device 3 that includes a motor 31, and an electrically-controlled device 4. The second embodiment differs from the first embodiment in the following respects.

The actuator device 2 of the second embodiment includes a resilient component 25 (e.g., a spring), a nail-striking assembly 26 to be driven by the resilient component 25 for striking a nail, and a lifting gear assembly 27 to be rotated by the motor 31 and detachably engaged with the nail-striking assembly 26.

The nail-striking assembly 26 is disposed at a side of the lifting gear assembly 27, and includes a striker mechanism 261 that is movable in the X-axis direction, a connecting component 262 that is connected to and moves together with the striker mechanism 261, and a movable component 32 that is connected to and moves together with the striker mechanism 261.

The lifting gear assembly 27 has two protrusions 271 that are configured to drive movement of the movable component 32 and the connecting component 262 when the lifting gear assembly 27 rotates, so as to move the striker mechanism 261 from a preparation position to a top dead center (TDC) position to compress the resilient component 25 for storing elastic potential energy. During the movement of the striker mechanism 261 from the preparation position to the top dead center position, the movable component 32 continuously presses the detector switch 45 and the detection signal S3 is thus continuously outputted. When the lifting gear assembly 27 releases the nail-striking assembly 26, the nail-striking assembly 26 is driven by the elastic potential energy stored in the resilient component 25 to move from the top dead center position to a bottom dead center (BDC) position to generate the kinetic energy.

It is noted that, when the controller 49 receives the detection signal S3, the motor 31 may keep rotating for a predetermined period of time to move the nail-striking assembly 26 to the preparation position, which is between the top dead center position and the bottom dead center position.

Briefly speaking, during a single predetermined stroke, the lifting gear assembly 27 moves the nail-striking assembly 26 from the preparation position to the top dead center position, and then the nail-striking assembly 26 is driven by the elastic force from the resilient component 25 to complete the nail striking and driven by the force from the rotation of the lifting gear assembly 27 to complete the compression of the resilient component 25 that stores the elastic potential energy. The movement of the nail-striking assembly 26 during the predetermined stroke brings the movable component 32 into the pre-arranged movement.

In the spring-loaded electric nail gun, the load comes from the elastic force to be stored in the resilient component 25 when compressed by the motor 31 rotating to move the nail-striking assembly 26, so the load has a predetermined fixed value which is known. In cooperation with the predetermined stroke that is known as well, the electric energy consumed by the spring-loaded electric nail gun would be a fixed value that is known. Therefore, the method of this disclosure can determine the capability of the battery 40 of the spring-loaded electric nail gun in storing the electric energy and discharging based on the stroke time period T.

It is noted that the structure for the spring-loaded electric nail gun to perform nail striking is not the focus of this disclosure, and reference thereof may be made to, for example, US Patent Publication Application No. 20210276171, Japanese Patent Publication No. 2007090473A, Japanese Patent Publication No. 2022068526, etc., so details of the structure for the spring-loaded electric nail gun to perform nail striking are omitted herein for the sake of brevity.

Figure 5:
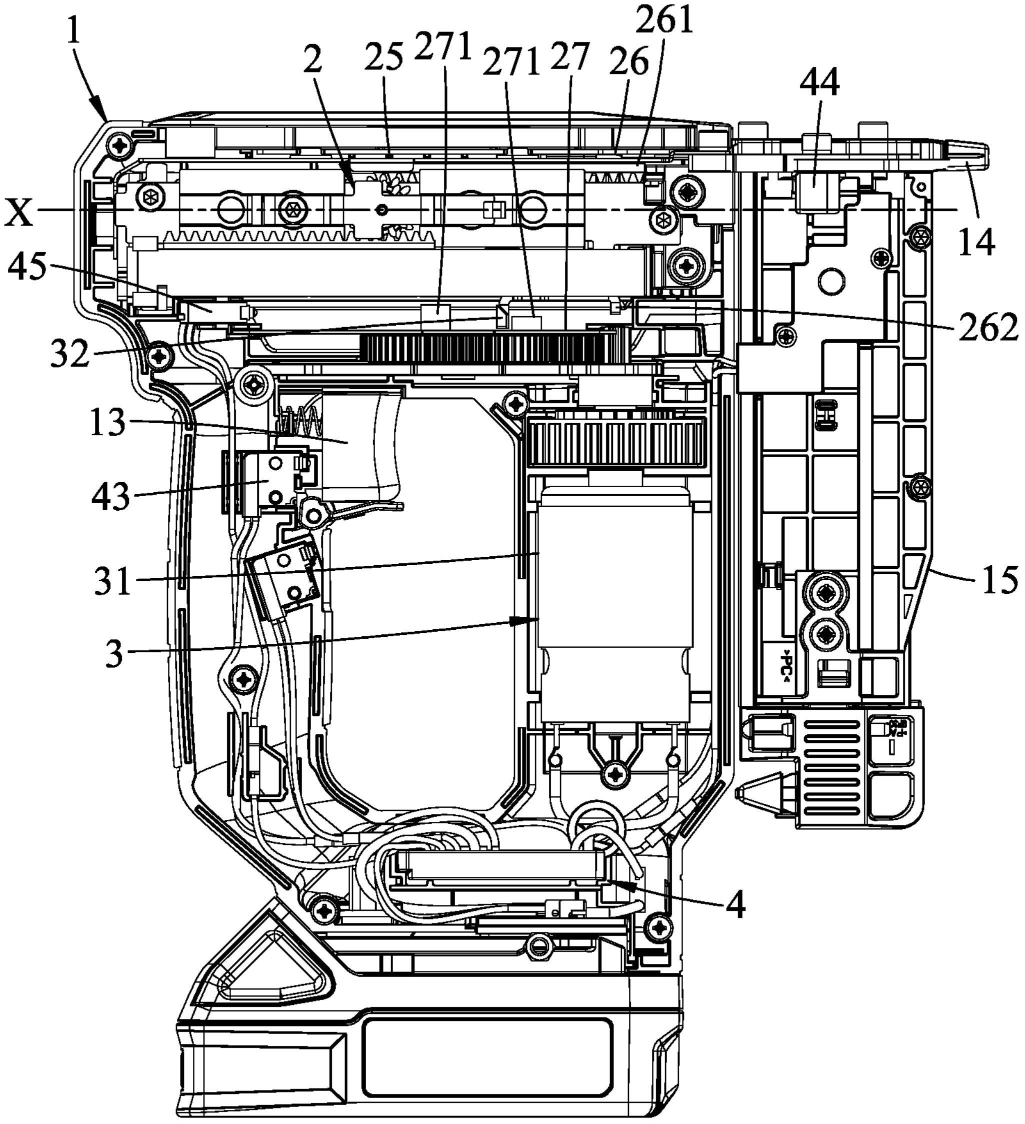
FIG. 5 is a fragmentary side view illustrating a second embodiment of an electrically-driven tool according to the disclosure.
Figure 6:
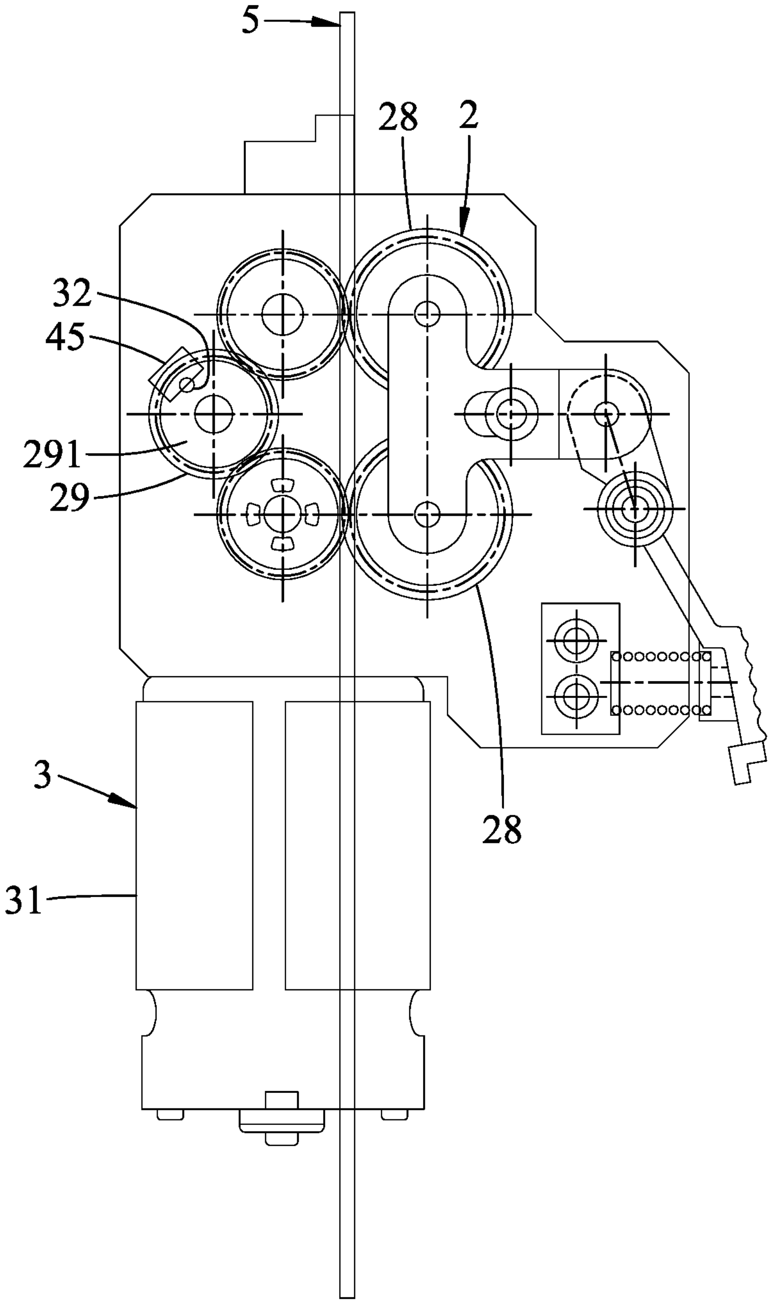
FIG. 6 is a fragmentary side view illustrating a third embodiment of an electrically-driven tool according to the disclosure.

It is noted that the electrically-driven tool of this disclosure is not limited to the pneumatic electric nail gun as illustrated in FIGS. 1 and 2 or the spring-loaded electric nail gun as illustrated in FIG. 5. In a third embodiment of this disclosure, the electrically-driven tool is a rebar tying machine as illustrated in FIG. 6. The rebar tying machine includes a machine body device (not shown), an actuator device 2, a kinetic device 3 that includes a motor 31 and a movable component 32, and an electrically-controlled device 4 (as depicted in FIG. 3). The third embodiment differs from the first embodiment in the following respects.

The actuator device 2 of the third embodiment includes two driving wheels 28 that are rotatable, and a transmission gear set 29 that is configured to be driven by the motor 31 to transmit the mechanical energy from the motor 31 to the driving wheels 28 that are configured to generate the kinetic energy to move a wire 5. In this embodiment, the transmission gear set 29 includes an intermediate gear 291 that is disposed to bring the driving wheels 28 into rotation.

In the third embodiment, the movable component 32 is mounted to the intermediate gear 291 of the transmission gear set 29.

During a single predetermined stroke, the intermediate gear 291 turns exactly one full circle (which corresponds to the fixed angle the motor 31 rotates for), and the driving wheels 28 are driven by the force from the rotation of the intermediate gear 291 to move the wire 5.

In the rebar tying machine, the load comes from the weight of the wire 5, so the load has a predetermined fixed value which is known. In cooperation of the predetermined stroke that is known as well, the electric energy consumed by the rebar tying machine would be a fixed value that is known. Therefore, the method of this disclosure can determine the capability of the battery 40 of the rebar tying machine in storing the electric energy and discharging based on the stroke time period T.

It is noted that the structure for the rebar tying machine to tie rebars is not the focus of this disclosure, and reference thereof may be made to, for example, European Patent Publication No. 1415917131, etc., so details of the structure for the rebar tying machine to tie rebars are omitted herein for the sake of brevity.

In summary, the method for detecting battery decline is adapted for use in an electrically-driven tool that has a fixed predetermined stroke. In a case where the load is known and thus the electric energy to be consumed in the predetermined stroke is known, the controller 49 that implements the method can determine the capability of the battery 40 in storing the electric energy and discharging based on the stroke time period T, thereby enabling the user to replace the battery 40 at the appropriate time.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is(are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. An electrically-driven tool, comprising:

an actuator device that is configured to output kinetic energy during a predetermined stroke;

a kinetic device that is configured to generate mechanical energy for said actuator device to output as the kinetic energy, and that includes a motor and a movable component, the motor being configured to be activated to convert electric energy into the mechanical energy during the predetermined stroke, the movable component being disposed to perform a pre-arranged movement during the predetermined stroke; and an electrically-controlled device that includes a battery to supply the electric energy to said motor, a detector switch, and a controller electrically connected to said battery and said detector switch, said detector switch being configured to output a detection signal when said movable component is detected thereby;

wherein said controller is configured to pre-store a dataset of energy provision time that includes at least one data piece of energy provision time, one of the at least one data piece signifying a predetermined time length presumed to be required by said battery to provide a predetermined amount of electric energy;

wherein said controller is configured to provide the predetermined amount of electric energy to said kinetic device to have said kinetic device perform the predetermined stroke with a predetermined load, and time a stroke time period taken by the predetermined stroke;

wherein said controller is configured to determine whether the stroke time period is greater than the predetermined time length, and output a battery abnormality signal upon determining that the stroke time period is greater than the predetermined time length; and wherein said controller is configured to start the predetermined stroke based on a trigger signal, and to end the predetermined stroke based on the detection signal.

2. The electrically-driven tool as claimed in claim 1, wherein said electrically-controlled device further includes a trigger switch that is configured to output the trigger signal to said controller when being triggered.

3. The electrically-driven tool as claimed in claim 2, wherein said electrically-controlled device further includes a safety switch that is electrically connected to said controller, said safety switch is configured to output a safety signal to said controller when being triggered, and said controller is configured to start the predetermined stroke based on the detection signal, the trigger signal and the safety signal.

4. The electrically-driven tool as claimed in claim 1, wherein said electrically-controlled device further includes an alarm component that includes one of a light emitting component, a buzzer and a display, and that is configured to generate an alarm message in a form of one of light, sound and text based on the battery abnormality signal.

5. The electrically-driven tool as claimed in claim 1, being a pneumatic electric nail gun, wherein said actuator device includes a striking cylinder for receiving gas under a predetermined air pressure, a piston assembly movably located in said striking cylinder for striking a nail, and a lifting gear configured to be rotated by said motor and to be detachably engaged with said piston assembly;

wherein said piston assembly is configured to be driven by the predetermined air pressure to move from a preparation position to a completion position to generate the kinetic energy, and to be driven by said lifting gear to move from the completion position to the preparation position; and wherein said movable component is mounted to said lifting gear.

6. The electrically-driven tool as claimed in claim 1, being a spring-loaded electric nail gun, wherein said actuator device includes a resilient component, a nail-striking assembly configured to be driven by said resilient component for striking a nail, and a lifting gear assembly configured to be rotated by said motor and detachably engaged with said nail-striking assembly;

wherein said nail-striking assembly is configured to be driven by said lifting gear assembly to move from a preparation position to a top dead center position to compress said resilient component for storing elastic potential energy, and to be driven by the elastic potential energy stored in said resilient component to move from the top dead center position to a bottom dead center position to generate the kinetic energy when said lifting gear assembly releases the nail-striking assembly; and wherein said movable component is mounted to said nail-striking assembly.

7. The electrically-driven tool as claimed in claim 1, being a rebar tying machine, wherein said actuator device includes two driving wheels that are rotatable, and a transmission gear set that is configured to be driven by said motor to transmit the mechanical energy to said driving wheels;

wherein said driving wheels are configured to generate the kinetic energy to move a wire; and wherein said movable component is mounted to said transmission gear set.

* * * * *